May 13, 1930. R. HEAD 1,758,602
METHOD AND APPARATUS FOR PREPARING CREAM FONDANT AND THE LIKE
Filed March 14, 1928 2 Sheets-Sheet 1

Inventor:
RONALD HEAD.
by his Attorney:

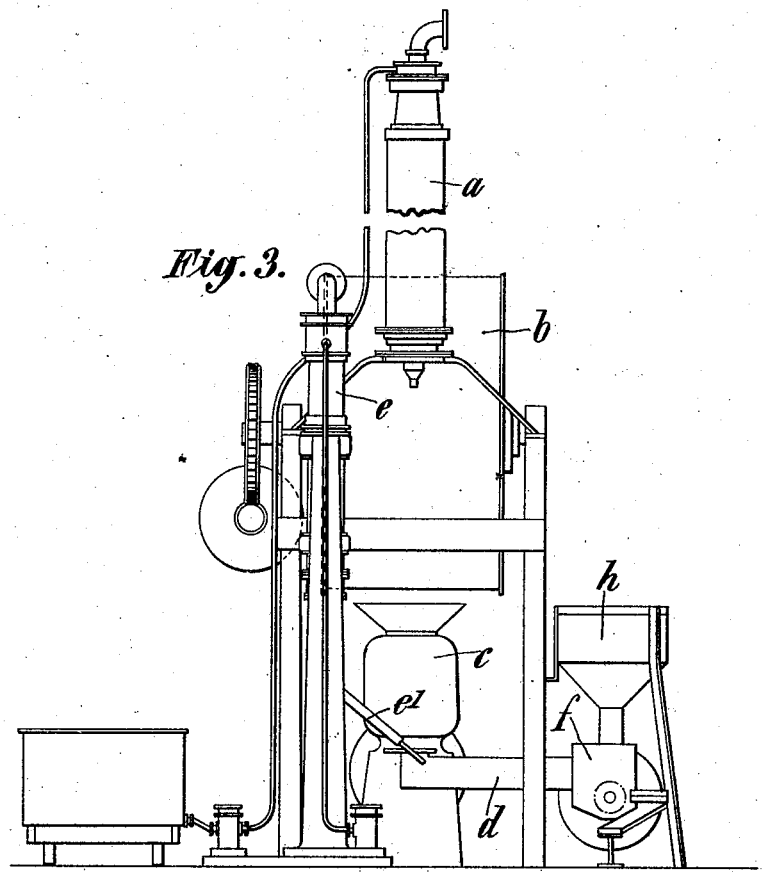

Patented May 13, 1930

1,758,602

UNITED STATES PATENT OFFICE

RONALD HEAD, OF LUTON, ENGLAND, ASSIGNOR TO BAKER PERKINS CO. INC., OF SAGINAW, MICHIGAN, A CORPORATION OF NEW YORK

METHOD AND APPARATUS FOR PREPARING CREAM FONDANT AND THE LIKE

Application filed March 14, 1928, Serial No. 261,683, and in Great Britain March 15, 1927.

This invention relates to an improved method and apparatus for preparing cream or fondant and the like generally used in the manufacture of confectionery or other purposes, and the object is to enable a finished cream or fondant to be produced which will require no special preparation for use after an elapse of time as is usually necessary.

In the usual manufacture of such fondant or cream, sugar syrup or the like is boiled, after which it is cooled and then beaten. In practice the boiling is preferably done in an automatic cooker from which the cooked syrup emerges on to, and is spread on a cooling drum, from which latter it is discharged into a beating apparatus to produce the fondant or cream.

Now according to the present invention and in order to produce the improved product, there is introduced into the mass, after it has already been partially beaten, that is to say at a suitable point along the beater or at or about the discharge point of the beater aforesaid, a diluting syrup cooked or heated to a desired degree and adapted to soften the originally partially produced fondant or cream and prevent recrystallization thereof. This syrup to be added may be separately prepared in an auxiliary automatic cooker arranged in parallel to the main cooker and of smaller dimensions than the latter in order that the required proportions of the two syrups may be easily determined, or the same purpose may be attained by taking a proportion, say 15 to 25 per cent, of the syrup from the outlet of the main cooker and further heating the same, and subsequently returning this quantity to the remainder of the mass after the latter has been beaten as aforesaid.

The fondant or cream and added syrup are then further beaten and mixed in the said beater, or are passed automatically into a second beater or mixer of any desired or conventional construction and of suitable capacity.

The said additional syrup may contain substances such as glucose, albumen etc. which will effect the retardation of recrystallization of the fondant cream and preserve the desired consistency and texture, or these substances may be automatically introduced at a further desired point into the beater or into the additional beater, and there may also be introduced at the desired point or points, any desired colouring flavouring or other matter or matters.

The accompanying drawings show diagrammatically one form of apparatus for carrying out the invention in which:—

Figure 1:
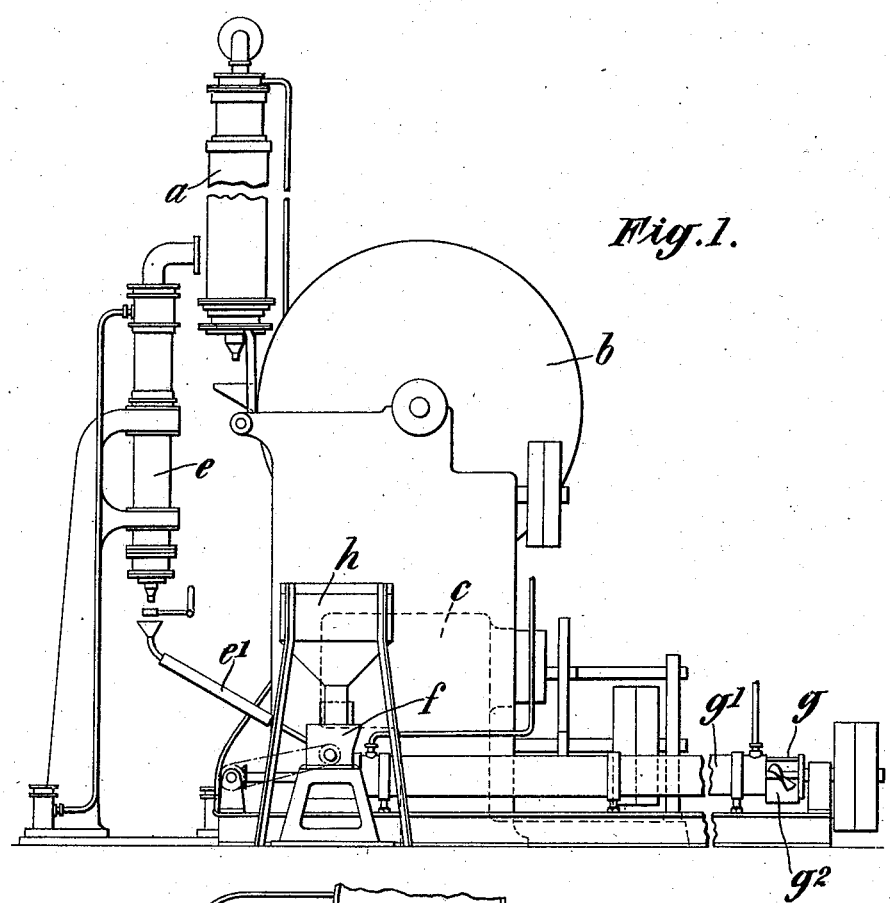
Figure 2:
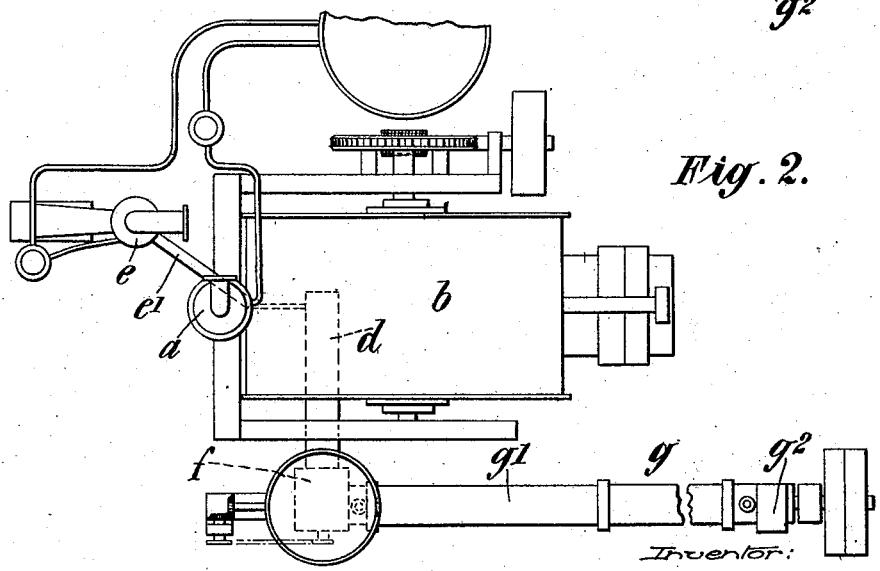

Fig. 1 is a side elevation, Fig. 2 a plan and Fig. 3 an end elevation.

The apparatus for producing the fondant or cream is of known construction and comprises an automatic cooker $a$ in which the sugar syrup boiled and from whence it is passed onto and is spread on a cooling drum $b$ and discharged from the latter into a beating apparatus $c$.

The partially prepared fondant or cream is discharged into a beater or mixer $d$, and for the purposes of producing the improved product, there is added to the said mass in the beaters $c$ or $d$ the predetermined quantity of cooked or heated diluting syrup.

Said additional syrup may pass from the cooker $e$ arranged in parallel with and of smaller dimensions than the main cooker $a$ or from a heater supplied from the main cooker $a$ as aforesaid through a pipe $e^1$ and discharged into the beater $d$ at or adjacent the point of inlet of the fondant or cream.

The fondant and additional syrup are then passed through union box $f$ into a further beater or mixer $g$ which is jacketed as at $g^1$ for the reception of tempering medium and from the end of which it is discharged through outlet $g^2$.

A further addition of glucose, albumen, colouring or flavouring matter may be introduced into the beater $d$ or $g$, there being shown by way of example a hopper $h$ dicharging into the union box $f$, said hopper being jacketed or otherwise according to requirements.

It will be understood that the beaters or mixers $d$ and $g$ may be aligned and constructed in one if desired instead of two, as may be most convenient in the disposition of the plant.

The object of using the hot syrup in two portions, reserving one portion in its hot state to be added at a later stage of the process to the other portion, which latter will meanwhile have been cooled and crystallized, is to bring the whole mass into a state in which, when it is poured into the starch moulds, it will set rapidly instead of slowly.

The explanation of this is found in certain peculiarities of action of these boiled sugar solutions. If the whole of the boiled sugar were treated by passing it over the cooler drum $b$, and thence to the beater, it would either crystallize too fully, when it would be difficult to work the flavouring into it, and would probably clog in the mixer $g^1$, or, alternatively, if reheated alone, it would come into the moulds in such a condition that it would take several hours to harden in the moulds sufficient to enable the "centres" to be removed and handled. This latter is the usual practice in dealing with batches and is subject to the disadvantage just mentioned.

But if one portion (say two-thirds of the cooked syrup) is cooled to the proper extent and then beaten, it will crystallize in minute microscopic crystals in the beater; and if, then, the other portion (say one-third of the total syrup) is not previously cooled and beaten but is added hot and uncrystallized, it will enable the already crystallized portion to be further carried along to the moulds together with the added frappe etc., and it will also have the effect that the fondant in the moulds will set very rapidly (say, in about twenty minutes).

This acceleration of the setting is probably due to the sugar in the hot syrup crystallizing after the mass has been deposited in the starch moulds, through the slow cooling brought about by its contact with the cold crystalline portion and through the seeding effect of the microscopic crystals in this same portion.

Thus the rationale of the process appears to be, first, to enable the greater bulk of the sugar to crystallize in a minute grain before it reaches the moulds; second, to partially remelt this crystalline mass by subsequent addition of relatively hot syrup; and, third, to cause the partially remelted crystalline mass to react on the hotter added syrup so as to inaugurate the crystallization of the latter in such a way that the major portion of this crystallization will take place in the starch moulds. The same result would not be reached if the whole of the syrup were cooled at the same time, because if the cooking were carried so far as to give quick setting in the moulds, the texture of the fondant would be too hard.

The hot syrup (thinning) is added to the fondant at as high a temperature as possible in order to get the fullest effect of the heat units it carries in melting the fondant. Were it practicable to do so, the temperature of this syrup would be raised; but in so doing, the cooking temperature would necessarily be raised so high as to be disastrous.

The syrup is added in order that a new lot of uncrystallized sugar syrup may be included in the batch which will crystallize after the mass is deposited in the starch moulds. The crystallization of the sugar in this syrup is retarded by the action of the stirrer and particularly by the introduction of a colloidal substance incorporated with the flavouring so that it does not crystallize until it reaches the starch moulds. The desired effect cannot be obtained and maintained at its most effective point, however, in an intermittent or batch mixing: the process must be continuous.

The actual practical result of the process is that the fondant produced sets in the moulds in a much quicker time than the ordinary method, say 20 minutes or thereabouts, as against 6 or 8 hours.

Although the "centres" made in the starch moulds in this way set sufficiently to be removed for coating in such a short time, it will be understood that after they are coated, with chocolate for instance, they will regain the soft condition in due course, and it has been found that "centres" made by the process are of excellent quality.

The invention is distinctly valuable in the saving of time, saving in number of starch moulds, capability of reutilizing the starch moulds quickly and without necessity for drying them out, saving of factory space and of men's time.

What I claim as my invention and desire to secure by Letters Patent of the United States is:—

1. A continuous method of preparing cream fondant, comprising the steps of continuously cooking and then cooling sugar syrup; subjecting the cooled syrup to a partial beating action; continuously adding to the partially-beaten syrup a predetermined proportion of uncooled, unbeaten diluting syrup which, at the time of its addition, is hotter than the mass whereto it is added; and then subjecting the fondant mass and added syrup to further beating.

2. A continuous method of preparing cream fondant, comprising the steps of continuously cooking and then cooling sugar syrup; subjecting the cooled syrup to a partial beating action; continuously adding to the partially-beaten syrup a predetermined proportion of uncooled, unbeaten diluting syrup which, at the time of its addition, is hotter than the mass whereto it is added, said diluting syrup containing a substance which will retard recrystallization; and then subjecting the fondant mass and the added syrup and retarding substance to further beating.

3. Apparatus for preparing cream fondant, comprising a cooker; a rotary cooling drum located adjacent the cooker to receive cooked syrup on its peripheral wall; beating means adjacent the drum to receive the cooled syrup; and means for supplying a predetermined quantity of heated diluting syrup to said beating means.

4. Apparatus for preparing cream fondant, comprising a cooker; a rotary cooling drum adjacent the same to receive cooked syrup on its peripheral wall; a beater adjacent the drum to receive the cooled syrup; means for supplying a predetermined quantity of heated diluting syrup to the fondant mass contained in said beater; a second beater; and means for delivering the fondant mass and diluting syrup from the first beater to the second.

5. Apparatus for preparing cream fondant, comprising a main cooker; a rotary cooling drum adjacent the same to receive cooked syrup on its peripheral wall; an auxiliary cooker adjacent the main cooker; and a beater to receive cooled syrup from the drum and heated diluting syrup from the auxiliary cooker, respectively.

6. Apparatus for preparing cream fondant, comprising a main cooker; a rotary cooling drum adjacent the same to receive cooked syrup on its peripheral wall; an auxiliary cooker adjacent the main cooker; a beater to receive cooled syrup from the drum and heated diluting syrup from the auxiliary cooker, respectively; a second beater; and means for delivering the fondant mass and diluting syrup from the first beater to the second.

In witness whereof I have signed this specification.

RONALD HEAD.